Feb. 5, 1952     C. V. MORINE     2,584,361
HARVESTING MACHINE
Filed May 24, 1948     6 Sheets-Sheet 1

Inventor
CHARLES VICTOR MORINE
By Lyon & Lyon
Attorneys

Feb. 5, 1952

C. V. MORINE 2,584,361

HARVESTING MACHINE

Filed May 24, 1948

Inventor
CHARLES VICTOR MORINE
By Lyon & Lyon
Attorneys

Feb. 5, 1952     C. V. MORINE     2,584,361
HARVESTING MACHINE Filed May 24, 1948     6 Sheets-Sheet 3

Inventor
CHARLES VICTOR MORINE
By Lyon & Lyon
Attorneys

Feb. 5, 1952 — C. V. MORINE — 2,584,361
HARVESTING MACHINE
Filed May 24, 1948 — 6 Sheets-Sheet 6

Inventor
CHARLES VICTOR MORINE.
By Lyon & Lyon
Attorneys

Patented Feb. 5, 1952

2,584,361

UNITED STATES PATENT OFFICE 2,584,361

HARVESTING MACHINE

Charles Victor Morine, Wahiawa, Territory of Hawaii, assignor to California Packing Corporation, San Francisco, Calif., a corporation of New York Application May 24, 1948, Serial No. 28,884

14 Claims. (Cl. 214—83.1)

This invention relates to harvesting machines, and more particularly to a machine for the harvesting of pineapples. Pineapples are harvested in prime ripe condition and in this condition are easily bruised or damaged. They are harvested from plants planted in large fields. The pineapple plants are planted in rows and large plots and it has become the practice to traverse such plots with link conveyers which extend across the rows of pineapple plants moving the conveyers along the plots lengthwise of the rows to enable the pineapple pickers to place the ripe pineapples upon the conveyers as they are picked. The pineapples are thus transported out of the plot to an aisle to another collecting position between the plots of pineapple plants.

It is an object of my invention to provide a pineapple harvester which is adapted to collect the pineapples from the pickers and to distribute the same to a mobile receiving box operatively associated with the collecting conveyer unit and to so position the pineapples in the mobile receiving box and to move the pineapples in such position from the field to the box as to avoid undue injury to the fruit.

Another object of my invention is to provide a collecting system for receiving and collecting pineapples from a field which is of such construction and operation as to enable us to receive and distribute the pineapples to a receiving box without injury.

Another object of my invention is to provide a mobile collecting and distributing unit for receiving and distributing pineapples, a mobile receiving box for receiving the pineapples from the mobile collecting and distributing unit, means for interconnecting such units in definite relation, and a distributing means operating between the mobile unit and in effect, laying the pineapples in the box progressively of its length and depth to avoid injury of the fruit.

Other objects and advantages of this invention it is believed will be apparent from the following detailed description of a preferred embodiment thereof as illustrated in the accompanying drawings.

In the preferred embodiment of my invention illustrated in the accompanying drawings, the invention is illustrated as including a receiving and collecting unit A provided to receive the pineapples as they are picked in the field, elevate the same to a position where they are transferred to a distributing conveyer which is longitudinally movable with respect to the collecting, elevating and receiving means, and which is provided at its discharge end with a positioning and placing unit B operative in conjunction with the movement of the distributing conveyer for positioning and placing the pineapples in the box of the mobile receiving box unit C. The function of the mobile box unit C is to receive the pineapples as they are collected in the field from the placing and positioning unit B in such manner that the pineapples are positioned longitudinally and vertically in the box of the unit C progressively rearwardly from the forward end of the box C as this mobile box unit C is releasably coupled in leading and trailing relation through the medium of a coupling unit D with a receiving and collecting unit A.

In order to permit the receiving and collecting unit A to carry out its required functions, the same may be of the preferred construction illustrated which includes preferably a self-propelled unit illustrated as a track-laying type of tractor 1 upon which there is provided a frame 2 supporting a turret base 3 upon which there is positioned a turret head 4 so as to be rotatable with relation to the base 3 through the medium of a bearing ring 5. The turret head 4 supports the collecting conveyer 6, the receiving conveyer 7, the elevating conveyer 8 and the distributing and positioning conveyer 9.

The receiving conveyer 7 extends laterally from the tractor 1 and is composed of a plurality of conveyer units positioned in the receiving conveyer frame 10 and which include the inner conveyer unit 11 and outer conveyer unit 12 and an intermediate conveyer unit 13. These conveyer units are positioned in end to end relation with the inner unit offset to the side of the intermediate conveyer unit 13. Each of the conveyer units consists of a suitable continuous belt which passes over suitable conveyer rollers 14 at their opposed ends, which conveyer rollers are supported upon shafts journaled in the frame 10. Any suitable means are provided for driving the conveyers so that the inner conveyer unit 11 has its upper run of its belt moving in the direction of the arrow 15 while the outer conveyer unit 12 has the upper run of its belt moving in the opposite direction as indicated at 16.

The intermediate conveyer 13 is driven in a direction to have its upper run move in a direction to carry the pineapples to position to be received in the elevating conveyer 8 as illustrated by the arrow 17. Suitable means are provided for so driving the respective conveyers as well as the elevating conveyer 8, which means are herein illustrated as including a motor or driving unit 18 which is carried by the frame 10 and driven through a suitable speed reduction 19 to drive the shaft 20 to which the lower roller 21 of the elevating conveyer 8 is secured. A suitable drive connection 22 is provided for driving the innermost conveyer roll 14ª of the intermediate conveyer 13.

Secured to the shaft 23 supporting the roller 14ª is a gear 24 which meshes with an idler gear 25 supported by a supporting bracket 26. A suitable drive connection 27 is provided from the gear 25 to the shaft 28 upon which is secured the driven roller 29 of the draper conveyer 30. A suitable drive connection 31 is. provided from the shaft 28 to the shaft 32 supported in the frame 10. A drive connection 33 is provided between the shaft 32 and the driven roller 14ᵇ of the inner conveyer 11.

The conveyer 12 as it is driven in the same direction as the intermediate conveyer 13 is driven through the medium of a drive connection 34 provided between the adjacent conveyer rollers 14 of the two conveyers 12 and 13 respectively.

Figures 1, 3:
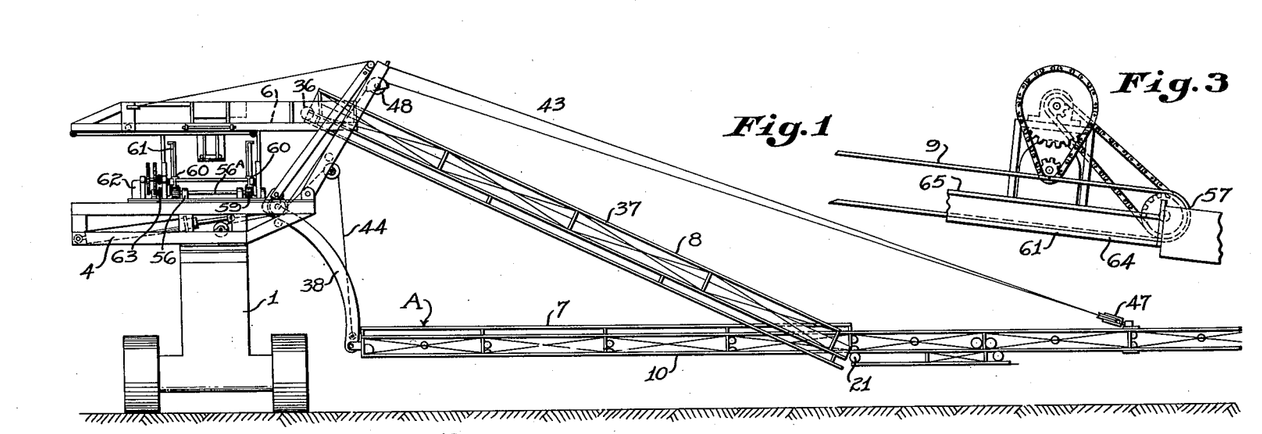
Figure 1 is a front elevation of the mobile receiving and distributing conveyer unit embodied in my invention.
Figure 3 is an enlarged fragmental view of the driving connections for the distributing conveyer.
Figure 2:
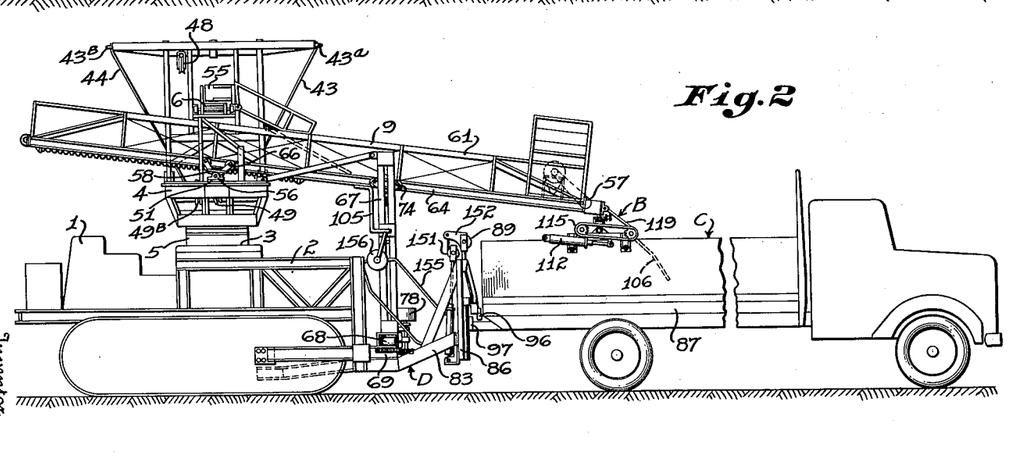
Figure 2 is a side elevation of the feeding and distributing conveyer unit and mobile box unit and illustrating interconnecting and distributing means operating between the said units.
Figures 4, 6:
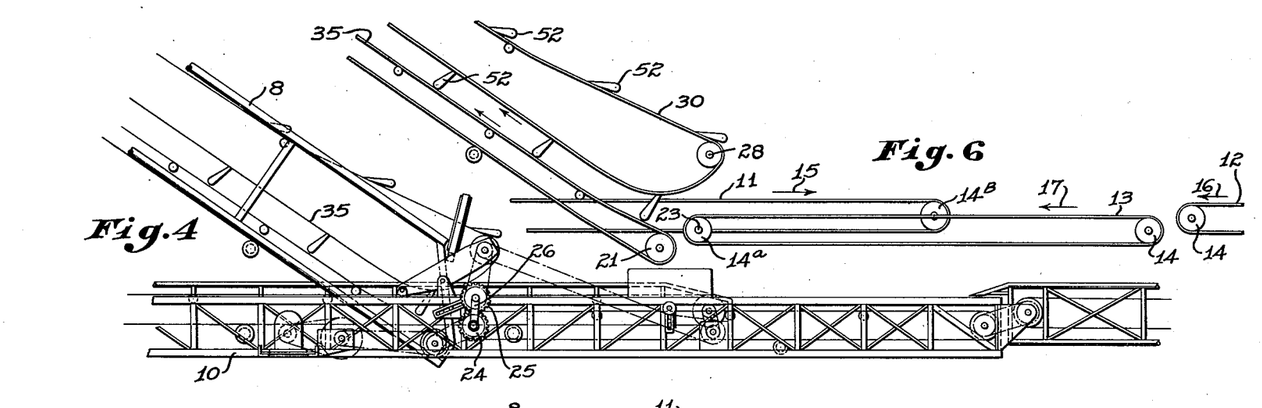
Figure 4 is a fragmental elevation upon a larger scale of the pineapple receiving conveyer system.
Figure 6 is a diagrammatic view of the receiving conveyer system illustrating the directions of travel and relationship of the different elements of the system.
Figures 5, 7:
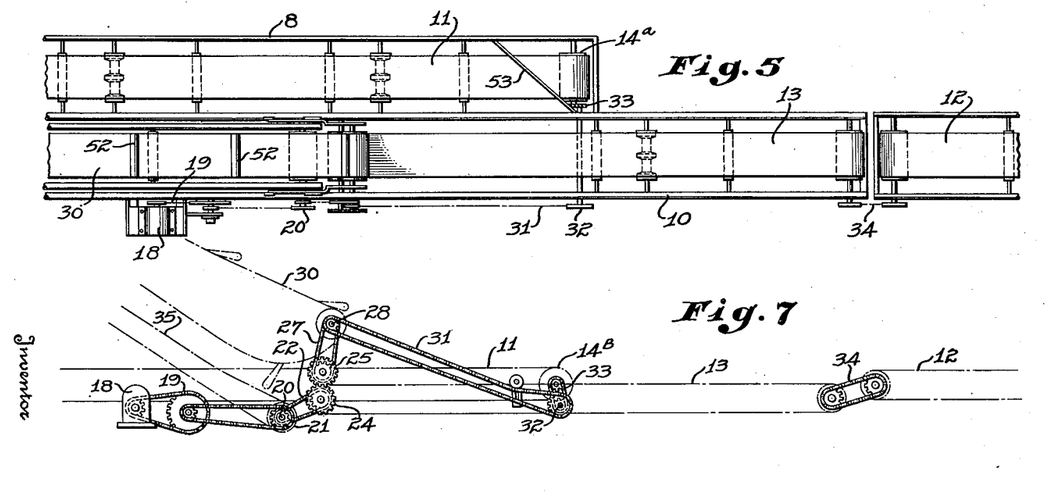
Figure 5 is a plan view of the pineapple receiving conveyer system of Figure 4.
Figure 7 is a diagrammatic view of the driving means for the distributing conveyer system.
Figures 8, 9, 10, 11, 12:
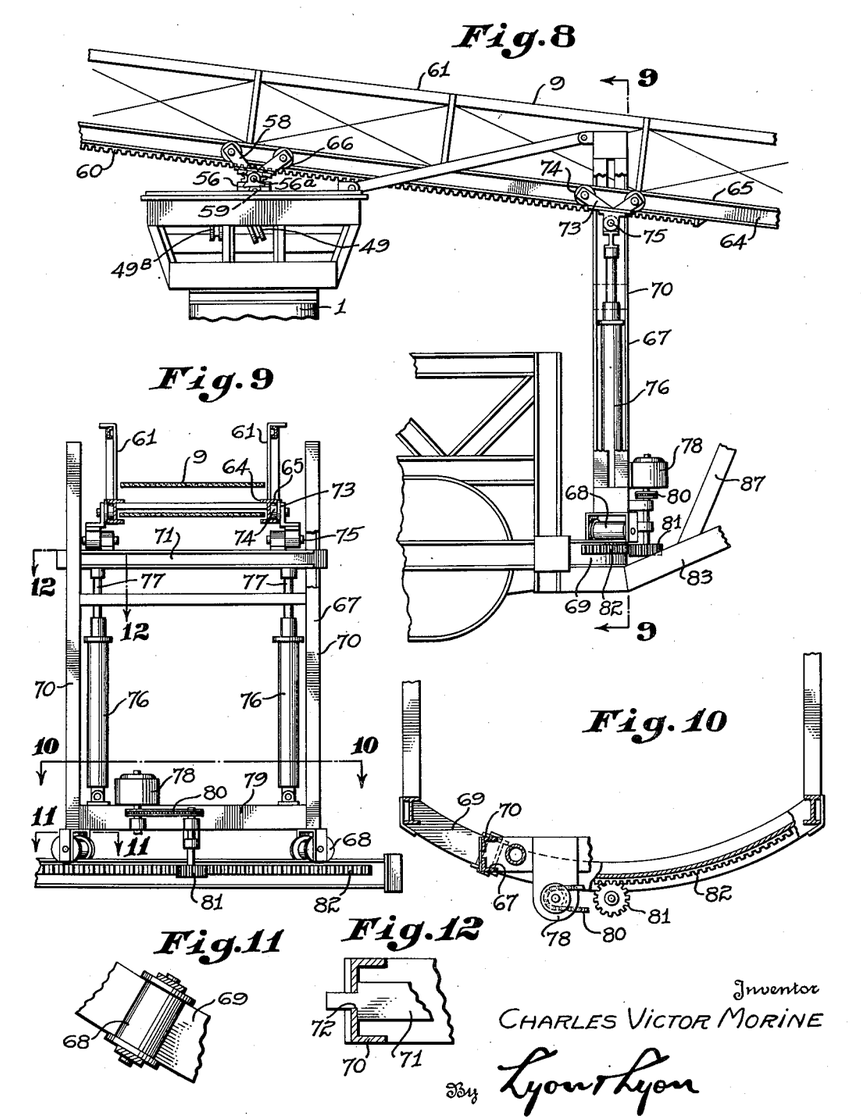
Figure 8 is a fragmental elevation of the distributing conveyer and its supporting and actuating means.
Figure 9 is an end elevation taken substantially on the line 9—9 of Figure 8.
Figure 10 is a plan view taken substantially on the line 10—10 of Figure 9.
Figure 11 is a view taken substantially on the line 11—11 of Figure 9.
Figure 12 is a view taken substantially on the line 12—12 of Figure 9.
Figure 19:
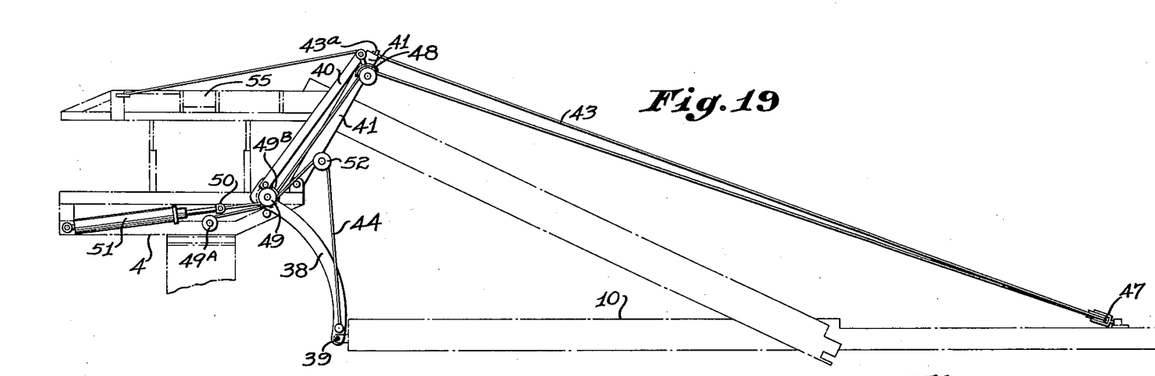
Figure 19 is a diagrammatic side elevation of the collecting conveyer and its supporting and elevating means.
Figure 20:
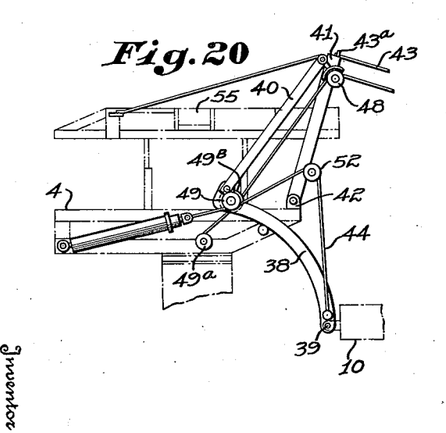
Figure 20 is a view similar to Figure 19 illustrating the conveyer supporting means in raised position.
Figure 21:
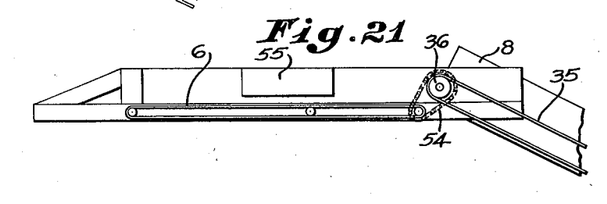
Figure 21 is a fragmental plan view illustrating the intermediate receiving conveyer and a fragment of the elevating conveyer and the driving relation of these conveyers.

The shaft is suitably journaled in the frame 10 and provides the means around which the elevating conveyer 8 may rotate as the conveyers 11, 12 and 13 are raised or lowered with relation to the ground. The elevating conveyer 8 is composed of an endless belt 35 trained over the driven roller 21 at its lower end and over an idler roller 36 at its upper end. A suitable frame 37 is provided for the elevating conveyer. The conveyer system thus provided extends laterally outward from the tractor 1 a suitable distance to cover the plot of pineapple plants and is supported from the tractor 1 in such manner as to permit the conveyer system to be raised or lowered as desired. The means provided for so supporting the conveyer system consists of side arms 38 which are pivoted to cross-shaft 39 at the end of the conveyer frame 10, and are pivoted on turret head 4 at their inner end. The arms 40 are secured at their upper end to the standard links 41. The links 41 are in turn pivotally secured to brackets 42 supported by the turret head 4. A pair of supporting cables 43 and 44 are provided. The supporting cable 43 consists of two lengths of cable, the dead ends of which are anchored as at 43ª and 43ᵇ (Fig. 2). The two lengths of cable pass through laterally spaced sheaves 47 at the outer end of the conveyer frame 10 at a point between the sheaves 47 and 48. The two lengths of cable 43 are joined together and the resultant single cable is run over the sheaves 48, 49, and is reeved upon a drum 49ª (Fig. 20). The other cable 44 has its dead end secured to the end of the arm 38 adjacent its pivotal connection 39 of the frame 10, passes over a pulley 52 supported by the standard link 41, passes under the pulley 49ᵇ, and is secured to the head 50 of the piston rod of the hydraulic cylinder 51. Hydraulic fluid is supplied to the cylinder 51 from any suitable source to move the piston in a direction to impart a pulling force upon the cable 44, thus elevating the conveyer supporting means from the position indicated in Figure 19 to that indicated in Figure 20, thus raising the conveyers 11, 12 and 13 while maintaining the said conveyers in a position substantially parallel with the field.

It will be noted that in conjunction with the elevating conveyer 8 there is provided a standard form of draper conveyer 30 having drapers 52 spaced along its length for engaging the pineapples upon the conveyer belt 35 of the elevating conveyer to aid the elevating conveyer in its operation of elevating the pineapples from the intermediate conveyer 12 to the collecting conveyer 6.

A suitable cross-over or diagonal 53 is supported in the frame 10 for causing the pineapples to be transferred from the inner receiving conveyer 11 to the intermediate receiving conveyer 13. At the upper end the pineapples from the elevating conveyer 8 are delivered to the collecting conveyer 6 which is driven through a suitable drive connection 54 from the elevating conveyer 8.

Figure 22:
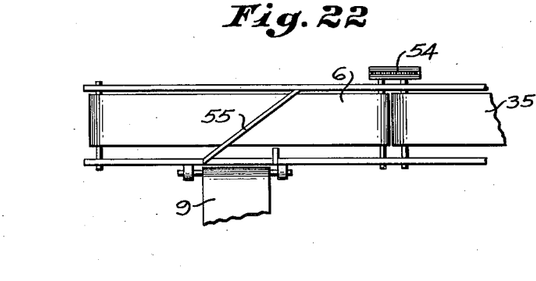
Figure 22 is a plan view of the conveyer system of Figure 21 illustrating the relationship of the intermediate receiving conveyer to the elevating and distributing conveyers.

The pineapples are transferred from the collecting conveyer 6 to the distributing conveyer 9 through the medium of a transfer gate or board 55 (Fig. 22). The distributing conveyer 9 is supported in such manner that it may be moved longitudinally as a unit and may also be rotated around its supporting trunnion 56 so that its discharge end 57 may be raised and lowered to suitably position the placing unit B with relation to the receiving box C. As the distributing conveyer 9 is supported upon the rotatable turret head 4, it may also be rotated and means are provided for rotating the conveyer 9 and hence the entire conveyer unit as it is supported upon the tractor 1. It will thus be seen that the distributing conveyer 9 is pivotally supported on its trunnion 56 between the supporting brackets 58 and 57.

Secured upon the shaft forming the trunnion 56 are gears 59 which mesh with parallel racks 60 secured to the frame 61 of the distributing conveyer 9. A motor 62 is provided for driving the shaft 56ª through a releasable clutch transmission 63. Thus by driving the shaft 56ª and its gears 59 either forward or backward, the conveyer 9 may be caused to move as a body forwardly or rearwardly with relation to the box C. The frame 61 includes side base bars 64 provided with spaced flanges 65 in which securing rollers 66 are positioned to hold the racks in engagement with the gears 59.

The means provided for rotating the conveyer 9 around its trunnion or shaft 56ª for thus raising or lowering the discharge end of the conveyer 9 and likewise for rotating the conveyer 9 or the entire conveyer system upon its turret support on the tractor 1 may be of any suitable or desirable construction and are herein illustrated as consisting of a supporting frame 67 carried on rollers 68 riding on an arcuate track 69 carried at the forward end of the supporting frame 2. The frame 67 is composed of spaced standards 70 in which a standard bar 71 is mounted to move vertically. The standard bars are thus slotted as indicated at 72 to receive the ends of the standard bar 71. Supported by the standard bar 71 are roller brackets 73 carrying spaced rollers 74 which are positioned between the flanges 65 of the side bars 64 of the frame 61 of the distributing conveyer 9.

The brackets 73 are pivotally supported upon pivots 75. The means provided for raising and lowering the standard 71 are herein illustrated includes 2 hydraulic cylinders 76 having pistons therein, piston rods 77 of which are connected with the bar 71 so that as hydraulic fluid is admitted to the opposed ends of the piston within the cylinder 76, the forward or discharge end of the distributing conveyer 9 is raised or lowered as required.

In order to permit the forward end of the conveyer 9 to be moved in an arc so that it may be properly aligned with the box of the mobile box unit C at all times, there is provided a motor 78 supported upon the cross standard 79 of the frame 67 which drives through a suitable drive connection 80, the gear 81 of which meshes with the arcuate rack 82 carried on the forward face of the arcuate track 69.

Means are provided for releasably coupling the mobile receiving box unit C to the conveyer unit A so that the said units are positioned in leading and trailing relationship and which also permits the ready disconnection of mobile box unit C from the conveyer unit A when the box of the unit is filled so that another box unit may be moved into position. The connecting means thus provided may be of any suitable construction but are herein illustrated as consisting of a pair of spaced bumper bars 83 suitably connected to the tractor frame of the tractor 1 and extending forwardly of the track 69.

Secured to the forward ends of the bumper bars 83 is a channel bar 84 carrying a hydraulic cylinder standard between its ends. Secured to the forward face of the channel bar 84 are spaced pipe uprights 86 suitably braced to the bumper bars 83 by means of diagonal braces 87. Secured to the channel bar 84 is a lift rod 88 carrying a pulley 89. Fitted within the pipe standards 86 so as to slide longitudinally thereof are pipes 90. The pipes 86 are slotted longitudinally of their length as indicated at 86ª so that supporting plates 91 and 92 are secured in spaced relation to the inner pipes 90 and may move longitudinally of the pipes 86 during movement of the pipes 90 therein.

The plates 91 and 92 are secured to brace rods 93 and form, with the pipes 90, a slide frame which carries at its lower extremity a clamp sleeve 94 adapted to receive the clamp in position, a shaft 95 carrying an engaging roller 96. The engaging roller 96 may thus be moved vertically with the slide frame formed to and from the position to engage the inner face of the bumper bar 97 carried by the mobile box unit C.

In order to raise and lower the slide carrying the roller 96, a cable 150 is secured as indicated at 157 to the slide frame at one end, and after passing over the pulley 89 and through the actuating pulley 151, it is secured to extension arm 152 carried at the upper end of the rod 88. The pulley 151 is operatively secured to the upper end of the piston rod 153 which carries at its opposite end the piston head mounted to reciprocate in the operating cylinder 154. The cylinder 154 is secured to and carried by the supporting bracket 85. Means are provided for admitting fluid under pressure to the opposed ends of the cylinder 154 so as to move the piston therein and hence the piston rod 153 in alternate directions, and this system is diagrammatically illustrated herein as including the conduits 155 connected to the opposed ends of the cylinder 154 and which pass through a selector valve 156 which may be actuated to determine to which end of the cylinder 154 the fluid under pressure is admitted. The selector valve 156 is of any suitable construction, as is well understood in the art, and is also provided with a connection with a conduit leading from a source of fluid under pressure, as is well understood in this art. The valve unit 156 may be actuated by means of a bracket 105 secured to the frame of the distributing conveyer 9 so that when the conveyer unit 9 is raised away from the mobile box unit C, the connection between the units A and C is broken.

The means provided for positioning and placing the pineapples within the box C is so constructed as to permit the filling of the box with pineapples without dropping the fruit. In order to accomplish this object, the positioning unit B is preferably constructed to provide an apron 106 which extends substantially the full width of the box C and provides the means for lowering the fruit into position. The apron 106 is secured to a shaft 107 carried in the end frame bars 108. The end frame bars 108 carry at their ends box-engaging rollers 109. Likewise carried on the shaft 107 are box-engaging rollers 110 which determine the depth to which the apron 106 is lowered in the box 111 of the mobile box unit C.

Means are provided for operating the apron 106 which include a hydraulic cylinder 112 which carries a piston secured to the piston rod 113. Means are provided for admitting hydraulic fluid to the opposite ends of the cylinder so as to move the piston in either direction selectively as desired.

Secured to the shaft 107 is a sprocket 114 over which an operating chain 115 is trained over an idler sprocket 116. Secured to the chain 115 is a bracket 117 through the medium of which the chain is likewise secured to the piston rod 113. At the forward end of the frame 61 of the distributing conveyer 9 there is provided a rod 118 connected between the side bars 64. A slanting apron 119 is pivotally secured at brackets 120 to the ends of the frame 61 to overlie the apron 106.

Means are provided between the frame 61 of the distributing unit 9 and the distributing and placing unit B for yieldably supporting the forward end of the distributing conveyer 9 and for taking up road shocks as the mobile units are moved over the field. Thus the two frame bars 108 are secured to a cross bar 121 and the rod 121 is in turn secured to a leaf spring 122. The leaf spring 122 is in turn secured at its midsection through the medium of a spring clamp 123 to the trunnion 124 secured at the center of the rod 118.

Figure 13:
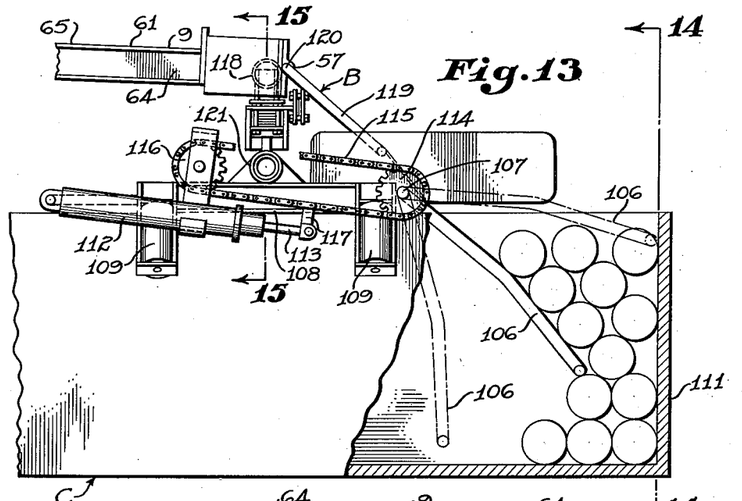
Figure 13 is a side elevation on a larger scale of the pineapple placing and positioning means indicating the same with relation to the receiving box and showing in dotted lines the apron in various positions.
Figure 14:
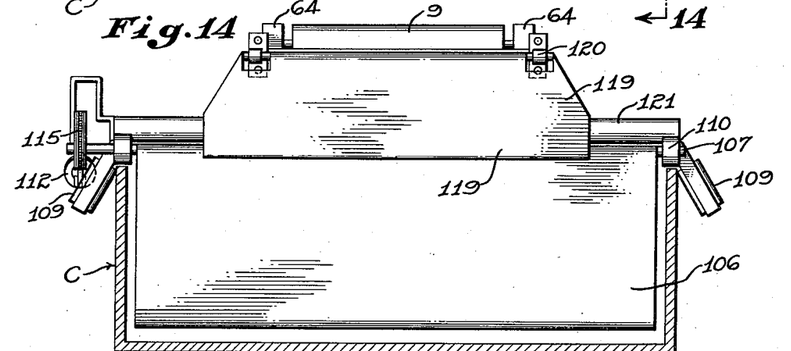
Figure 14 is an end view of the pineapple placing and receiving means looking in the direction of line 14—14 of Figure 13.
Figure 15:
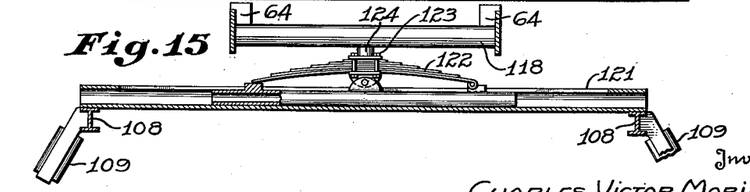
Figure 15 is a sectional end elevation taken substantially on the line 15—15 of Figure 14.
Figures 16, 17, 18:
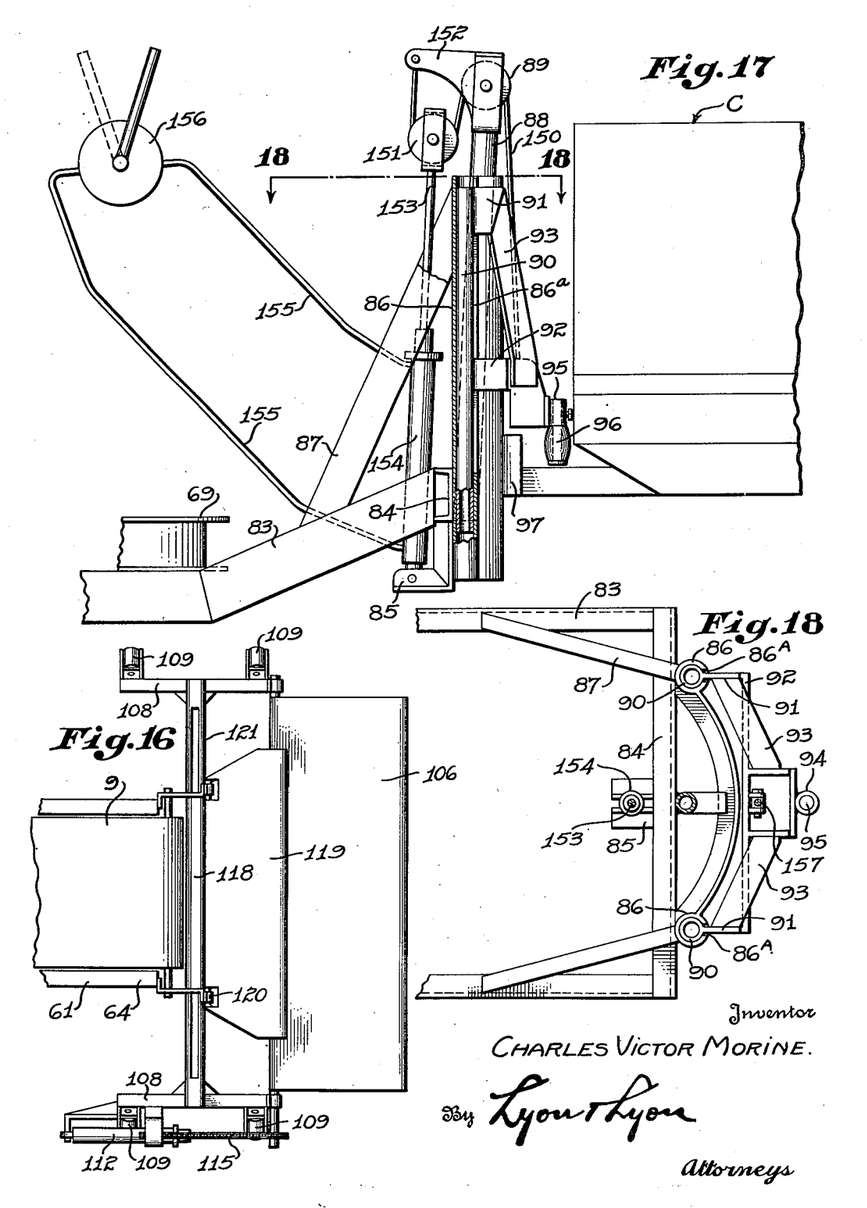
Figure 16 is a plan view of the distributing and placing means of Figure 13.
Figure 17 is a fragmental partially diagrammatic view of the mobile conveyer and mobile receiving box connecting means.
Figure 18 is a top plan view taken substantially on the line 18—18 of Figure 17.

In the operation of the harvester embodying my invention, I believe that it will be apparent that the receiving conveyers 11, 12 and 13 may be of any suitable extent required to traverse the plot of pineapples being picked. As the conveyer system is moved forward over the rows of pineapple plants, the pineapples are picked by the picker and placed upon the conveyer, either 11 or 12, depending upon which part of the plot the pineapple is picked from. The pineapples are thus conveyed to the center conveyer 13 and transferred to the elevating conveyer 8 where they are elevated through the operation of the elevator conveyer 8 and draper conveyer 30 to the collecting conveyer 6 over which the pineapples pass in being transferred to the distributing conveyer 9. A mobile box unit C is moved into position with reference to the conveyer unit A and the cylindrical hydraulic valve 104 is actuated to permit the roller 93 to pass back of the bumper bar 95, thus connecting the units A and C. The distributing conveyer 9 is then moved forwardly so that the apron 106 occupies the uppermost dotted line position as shown in Figure 13. Pineapples thus pass off from the conveyer 109 down the apron B and onto the apron 106 against the foremost wall of the box 111. As pineapples accumulate the apron 106 is lowered progressively to the position shown in the full line in Figure 16 and into the second dotted line position at which time the entire forward portion of the box between the front wall and apron are filled with fruit and as more pineapples are delivered to the box, the apron system is retracted to allow the fruit to settle into the voids filling the box without permitting the fruit to drop.

Having fully described my invention, it is to be understood that I do not wish to be limited to the details herein set forth, but my invention is of the full scope of the appended claims.

I claim:

1. In a harvesting machine, the combination of a conveyer adapted to traverse a multiplicity of rows of vegetation to be harvested, a conveyer for receiving and elevating the harvested material from the first conveyer, an intermediate receiving conveyer to which the harvested material is delivered by the elevating conveyer, a distributing conveyer to which the harvested material is delivered, feed adjusting means for longitudinally moving the distributing conveyer to move the position of the discharge end of the distributing conveyer relative to a mobile receiving box, means for raising and lowering the discharge end of the distributing conveyer to position the same with reference to the receiving box, the conveyers being operatively connected to and supported by and upon a mobile unit, said unit including turret means for rotating said conveyers about a vertical axis, the mobile receiving box being supported upon and carried by a second mobile unit, means operatively connecting the mobile units together in leading and trailing relation during the delivery of harvested material to the mobile receiving box, and a placing means carried by the discharge end of the distributing conveyer for placing the harvested material in the mobile receiving box from one end to the other of said box as the distributing conveyer is moved longitudinally of the receiving box by means provided for longitudinally moving the distributing conveyer.

2. In a pineapple harvester, the combination of a mobile conveyer unit for receiving pineapples and conveying the same to an elevated position, conveying the pineapples along a distributing conveyer, supporting means for the distributing conveyer, said means including turret means for rotating said distributing conveyer about a vertical axis, a mobile box connecting means releasably connecting the box with the mobile conveyer unit, the mobile box being positioned by said connecting means to receive pineapples from the distributing conveyer, and rack and pinion means positioned on the conveyer unit for moving the distributing conveyer bodily in the direction of its length to position the delivery end of the distributing conveyer adjacent the end of the mobile box so that the pineapples are first positioned in the end of the box remote from the conveyer unit, and the means for moving the distributing conveyer being operable to move the discharge end of the distributing conveyer rearwardly of the receiving box as the said box is progressively filled with pineapples.

3. In a pineapple harvester, the combination of a mobile conveyer unit for receiving pineapples and conveying the same to an elevated position, conveying the pineapples along a distributing conveyer, supporting means for the distributing conveyer, a mobile box connecting means releasably connecting the box with the mobile conveyer unit, the mobile box being positioned by said connecting means to receive pineapples from the distributing conveyer, and means positioned on the conveyer unit for moving the distributing conveyer in the direction of its length to position the delivery end of the distributing conveyer adjacent the end of the mobile box so that the pineapples are first positioned in the end of the box remote from the conveyer unit, and the means for moving the distributing conveyer being operable to move the discharge end of the distributing conveyer rearwardly of the receiving box as the said box is progressively filled with pineapples, and a vertically swingable apron carried by the delivery end of the distributing conveyer for placing the pineapples in the receiving box.

4. In a pineapple harvesting machine, the combination of a mobile unit, a conveyer system, means supporting said conveyer system on the mobile unit for rotation about a vertical axis, the said conveyer system including a plurality of laterally extending conveyers operating to deliver harvested material to a central position, an elevating conveyer adapted to receive the harvested material at the central position, a receiving conveyer to which the harvested material is discharged at the upper end of the elevating conveyer, and a distributing conveyer operably associated with the receiving conveyer and onto which the harvested material is discharged from the receiving conveyer.

5. In a pineapple harvesting machine, the combination of a mobile unit, a conveyer system, means supporting said conveyer system on the mobile unit for rotation about a vertical axis, the said conveyer system including a plurality of laterally extending conveyers operating to deliver harvested material to a central position, an elevating conveyer adapted to receive the harvested material at the central position, a receiving conveyer to which the harvested material is discharged at the upper end of the elevating conveyer, a distributing conveyer operably associated with the receiving conveyer and onto which the harvested material is discharged from the receiving conveyer, the distributing conveyer being supported by the mobile unit, and means operable to move the distributing conveyer bodily in the direction of its length.

6. In a pineapple harvesting machine, the combination of a mobile unit, a conveyer system supported upon the unit, the said conveyer system including a plurality of laterally extending conveyers operating to deliver harvested material to a central position, an elevating conveyer adapted to receive the harvested material at the central position, a receiving conveyer to which the harvested material is discharged at the upper end of the elevating conveyer, a distributing conveyer operably associated with the receiving conveyer and onto which the harvested material is discharged from the receiving conveyer, the distributing conveyer being supported by the mobile unit, means operable to move the distributing conveyer in the direction of its length, and means operably connected with the distributing conveyer for raising or lowering its discharge end.

7. In a pineapple harvesting machine, the combination of a mobile unit, a conveyer system supported upon the unit, the said conveyer system including a plurality of laterally extending conveyers operating to deliver harvested material to a central position, an elevating conveyer adapted to receive the harvested material at the central position, a receiving conveyer to which the harvested material is discharged at the upper end of the elevating conveyer, a distributing conveyer operably associated with the receiving conveyer and onto which the harvested material is discharged from the receiving conveyer, the distributing conveyer being supported by the mobile unit, means operable to move the distributing conveyer in the direction of its length, means operably connected with the distributing conveyer for raising or lowering its discharge end, and an apron unit having a vertically swingable apron secured to the discharge end of the distributing conveyer.

8. In combination, a mobile conveyer unit adapted to receive and convey harvested material to a longitudinally movable distributing conveyer, means for longitudinally and bodily moving the distributing conveyer, means for rotating said distributing conveyer about a vertical axis, a receiving box, means for operably and releasably connecting the receiving box with the mobile conveyer unit, the means for longitudinally moving the distributing conveyer being operable to move the discharge end of the distributing conveyer from the advanced end of the receiving box toward its opposite end as the box is filled with harvested material.

9. In combination, a mobile conveyer unit adapted to receive and convey harvested material to a longitudinally movable distributing conveyer, means for longitudinally moving the distributing conveyer, a receiving box, means for operably and releasably connecting the receiving box with the mobile conveyer unit, the means for longitudinally moving the distributing conveyer being operable to move the discharge end of the distributing conveyer from the advanced end of the receiving box toward its opposite end as the box is filled with harvested material, and a vertically swingable apron carried at the discharge end of the distributing conveyer for vertically determining the position of harvested material in the receiving box, and means for swinging the apron vertically.

10. In combination, a mobile conveyer unit, a mobile receiving box, a conveyer unit operatively associated with the mobile conveyer unit and including conveyer means adapted to distribute material from the conveyer unit to the mobile box unit, means for driving the distributing conveyer, means for releasably and operatively connecting the mobile receiving box with the mobile conveyer unit for maintaining the said units in operative relation during distribution from the conveyer unit to the box unit, the latter said means including a connecting element carried by the mobile conveyer unit and adapted to be coupled with a bumper bar carried by the mobile box unit, and means carried by the mobile conveyer unit for actuating the coupling element to and from bumper bar engaging position.

11. In a combination of the class described of two independent mobile units, means for distributing a harvested material from one mobile unit to the other, a bumper connection between the said units including a frame element carried by one of the mobile units, a slide frame operable in the first said frame and carrying a connecting roller, a bumper bar carried by the other mobile unit which is adapted to be engaged with the said roller, and means carried by the first said mobile unit for actuating the slide frame to move the engaging roller to and from engaging position.

12. In a combination of the character described, a distributing conveyer, a receiving box, a material placing element carried at the discharge end of the conveyer and over which material conveyed by the conveyer is adapted to pass in moving from the conveyer to the box receiving unit, the material placing element being adapted to be moved through an arcuate path in the receiving box and means for actuating the material placing element through said arc within the receiving box to position the material from the conveyer in the box in superposed position without permitting the material so positioned to drop in the box, and means for moving the conveyer and the material placing element longitudinally of the receiving box as the material is positioned in superposed position within the box.

13. In combination, a mobile conveyer unit adapted to receive and convey harvested material to a longitudinally movable distributing conveyer, means for longitudinally moving the distributing conveyer, means for rotating said distributing conveyer about a vertical axis, a receiving box, means for operably and releasably connecting the receiving box with the mobile conveyer unit, the means for longitudinally moving the distributing conveyer being operable to move the discharge end of the distributing conveyer from the advanced end of the receiving box toward its opposite end as the box is filled with harvested material, and guide rollers operably connected to the discharge end of said distributing conveyer, said guide rollers being adapted to engage the box to restrict lateral motion of the distributing conveyer as it is moved longitudinally, and said guide rollers being adapted to pivot with respect to said distributing conveyer about a vertical axis.

14. In combination, a mobile conveyer unit adapted to receive and convey harvested material to a longitudinally movable distributing conveyer, means for longitudinally moving the distributing conveyer, a receiving box, means for operably and releasably connecting the receiving box with the mobile conveyer unit, the means for longitudinally moving the distributing conveyer being operable to move the discharge end of the distributing conveyer from the advanced end of the receiving box toward its opposite end as the box is filled with harvested material, guide rollers operably connected to the discharge end of said distributing conveyer, said guide rollers being adapted to engage the box to restrict lateral motion of the distributing conveyer as it is moved longitudinally, and spring suspension means connecting said guide rollers to the end of said distributing conveyer.

CHARLES VICTOR MORINE.

REFERENCES CITED

The following references are of record in the file of this patent:

UNITED STATES PATENTS

| Number | Name | Date |
| --- | --- | --- |
| 619,463 | Bartlett et al. | Feb. 14, 1899 |
| 752,688 | Kramer | Feb. 23, 1904 |
| 1,563,387 | MacEachen | Dec. 1, 1925 |
| 1,884,101 | Moe | Oct. 25, 1932 |
| 2,005,442 | Spiegl | June 18, 1935 |
| 2,179,726 | Lewis | Nov. 14, 1939 |
| 2,196,880 | Van Voorhis et al. | Apr. 9, 1940 |
| 2,312,450 | Smith | Mar. 2, 1943 |
| 2,321,387 | Jackson | June 8, 1943 |
| 2,343,153 | Miller | Feb. 29, 1944 |
| 2,357,549 | Roberson | Sept. 5, 1944 |
| 2,406,992 | Butler | Sept. 3, 1946 |
| 2,450,152 | Miller | Sept. 28, 1948 |

FOREIGN PATENTS

| Number | Country | Date |
| --- | --- | --- |
| 70,944 | Sweden | Jan. 28, 1929 |